Nov. 17, 1959  H. A. FERGUSON ET AL  2,913,064
TRACTOR TRANSMISSION AND POWER TAKE-OFF SYSTEM
Filed March 23, 1956  6 Sheets-Sheet 2
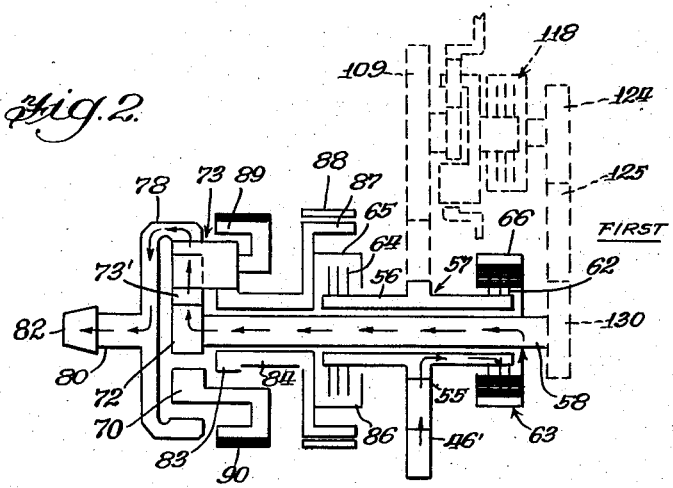
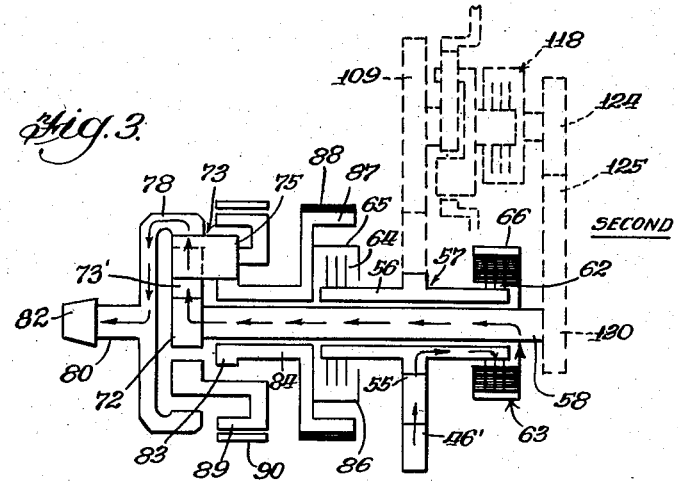
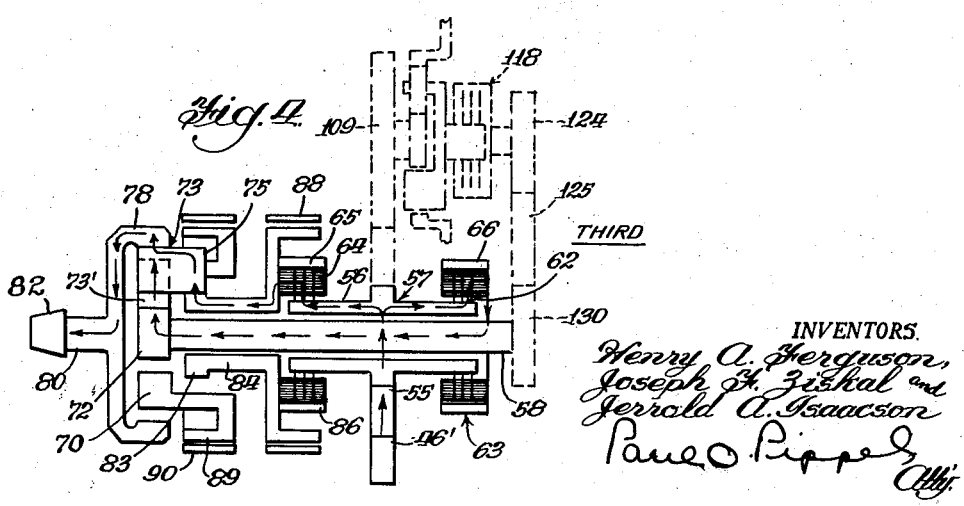
INVENTORS.
Henry A. Ferguson,
Joseph F. Zishal and
Jerrold A. Isaacson

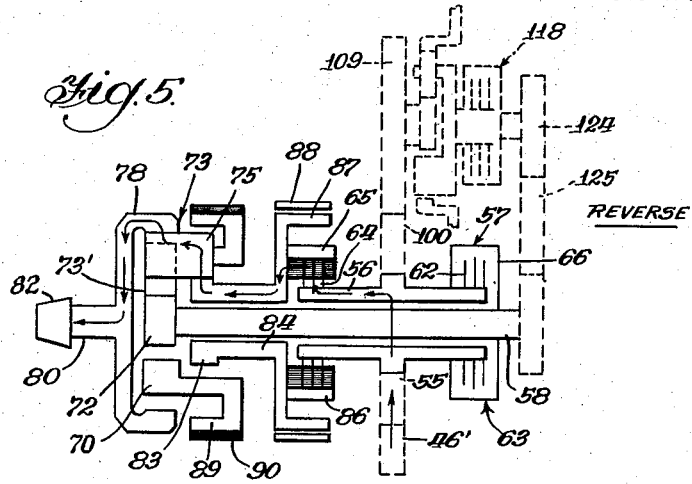
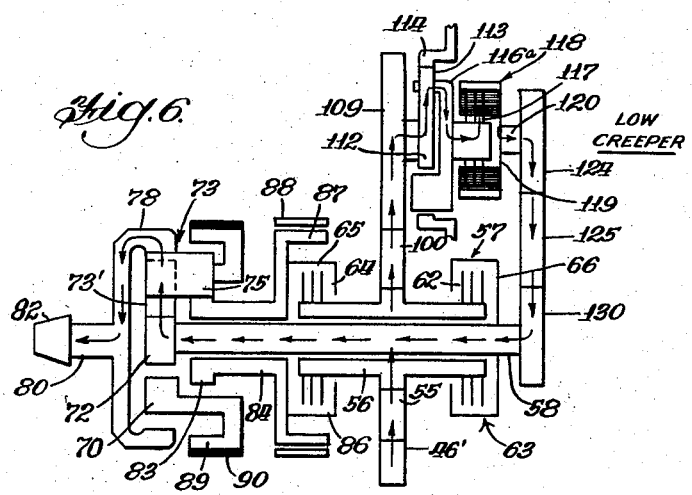
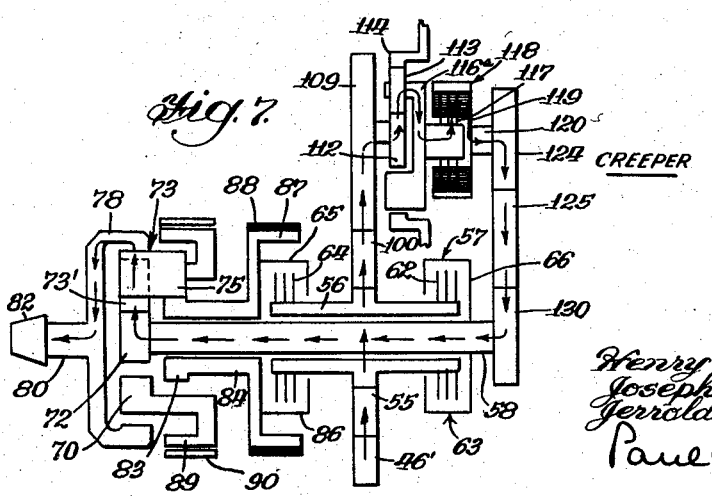

Nov. 17, 1959  H. A. FERGUSON ET AL  2,913,064
TRACTOR TRANSMISSION AND POWER TAKE-OFF SYSTEM
Filed March 23, 1956  6 Sheets-Sheet 4

INVENTORS.
Henry A. Ferguson,
Joseph F. Ziskal and
Jerrald A. Isaacson
Paul O. Pippel
Atty.

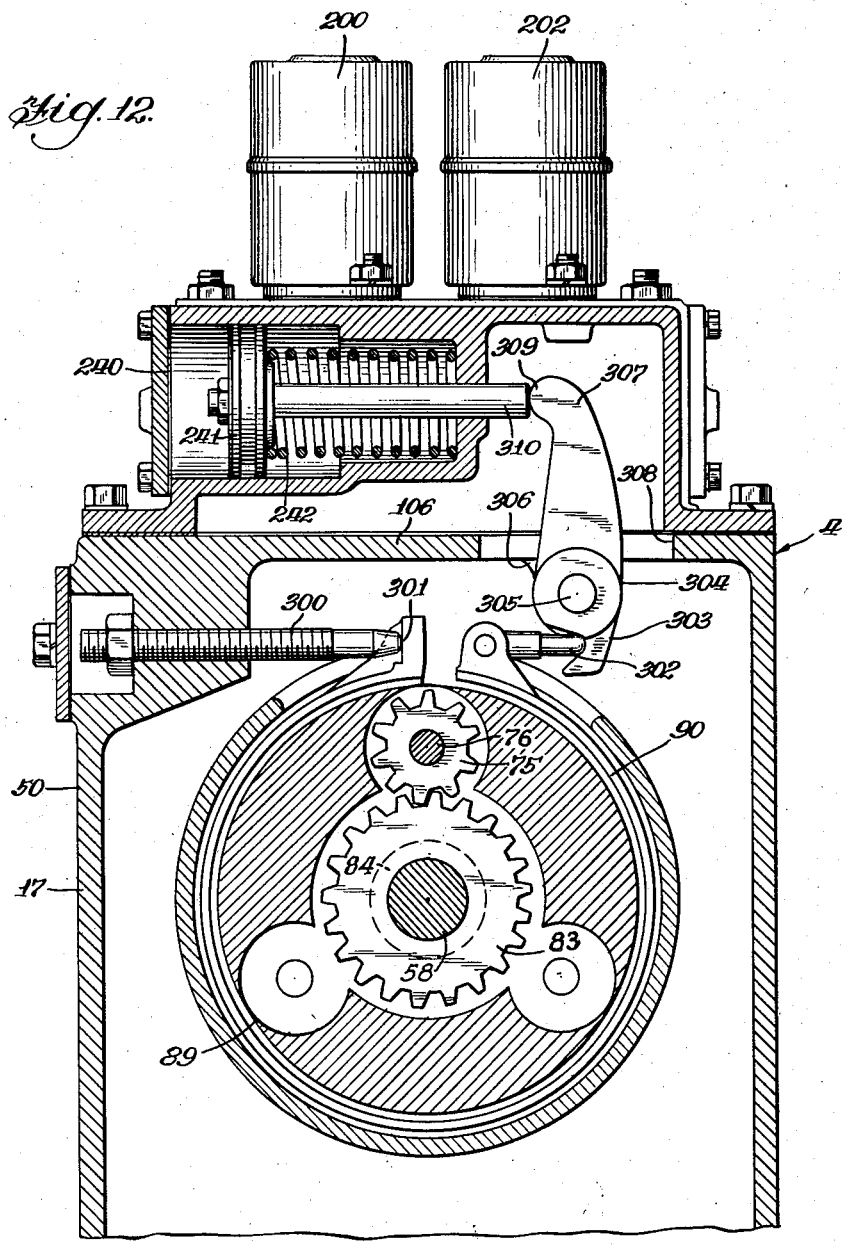

United States Patent Office 2,913,064
Patented Nov. 17, 1959

2,913,064

TRACTOR TRANSMISSION AND POWER
TAKE-OFF SYSTEM

Henry A. Ferguson, Lombard, Joseph F. Ziskal, Brookfield, and Jerrold A. Isaacson, Lombard, Ill., assignors to International Harvester Company, a corporation of New Jersey Application March 23, 1956, Serial No. 573,382

12 Claims. (Cl. 180—53)

This invention relates to transmissions and more specifically to a novel transmission adapted for incorporation in a tractor particularly of the farm type.

The general object of the invention is to provide a novel transmission between the tractor engine and the ground traversing means, whether wheel or track, wherein the transmission delivers the drive from the engine to the traversing means at different torque ratios and speeds and wherein the transmission is of simple and economical design and readily adaptable for incorporation in the tractor such as above described.

A more specific object of the invention is to provide a novel transmission which provides a continually running power take-off taken directly from the engine crankshaft and the ground drive being transmitted through a countershaft which is alternately connectable with the input shaft driven by a plurality of principal power trains which are coaxially arranged upon a countershaft for providing a normal driving range, the transmission further incorporating an auxiliary power train which bypasses a portion of the said principal power train and utilizes the remaining portion of it to effect different speed ratios in a subnormal or extremely low speed driving operation normally referred to in the art as creeper speeds.

A still further object of the invention is to provide a novel tractor transmission wherein the power trains are so arranged as to provide a compact and efficient assembly adaptable for incorporation in a farm tractor wherein a creeper speed unit is adapted to be added or omitted at the option of the purchaser.

These and other objects of the invention will become more apparent from the specification and the drawings; wherein:

Figures 2, 3, 4, 5, 6 and 7 are schematic or diagrammatic illustrations showing the operation and actuation of different portions of the transmission to obtain different speed ratios;

Figure 12 is a vertical transverse sectional view taken substantially on the line 12—12 of Figure 1.

Figure 1:
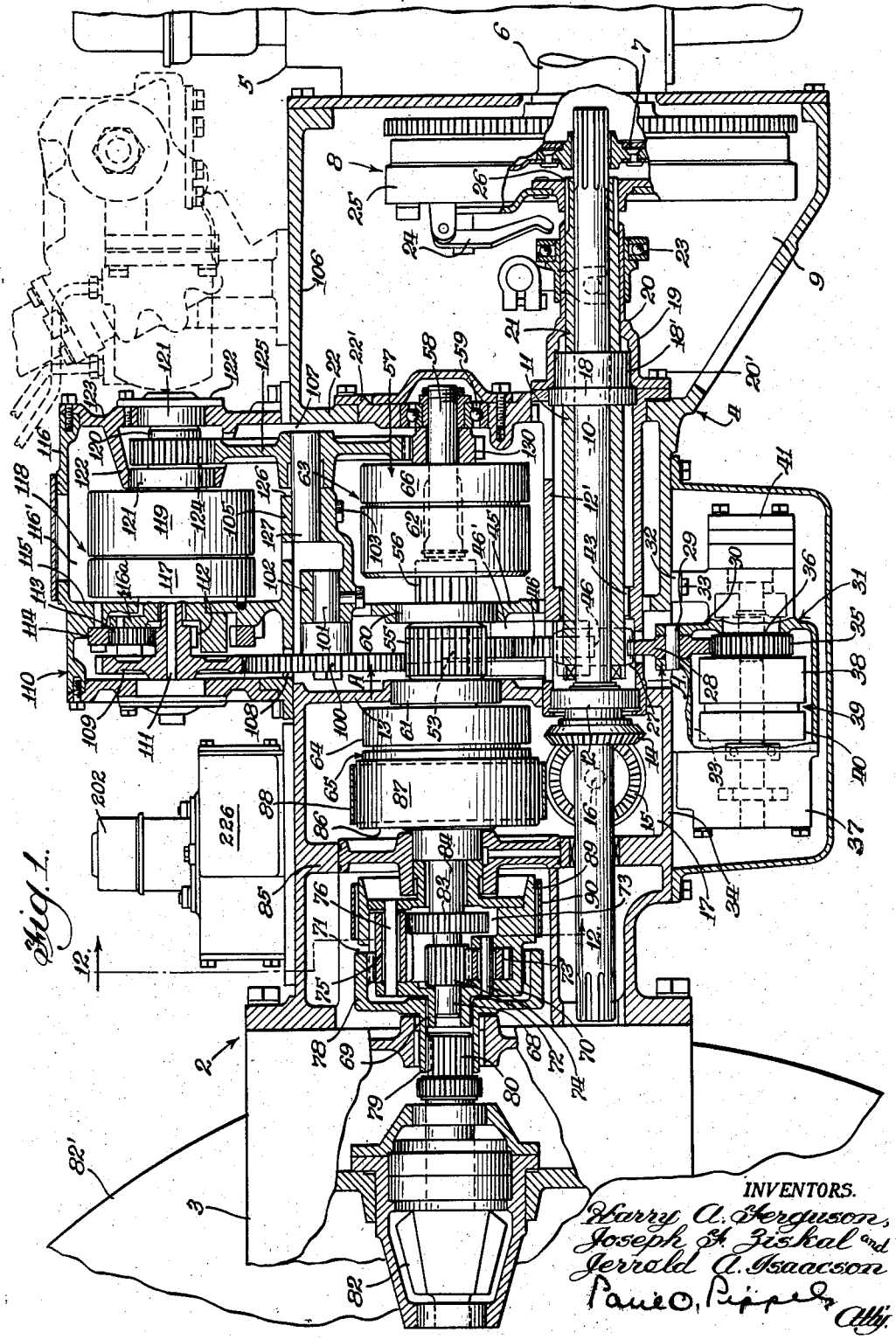
Figure 1 is a longitudinal sectional view of a tractor transmission housing and associated front engine and final drive showing the invention applied thereto.

Describing the invention in detail the tractor generally designated 2 may comprise a rear end or axle portion 3 which carries and mounts the axles and the ground-engaging wheels, 82' shown. The rear portion 3 is connected to an intermediate portion 4 which constitutes the waist of the tractor and the forward portion is connected to the engine 5 at the forward end of the tractor, the forward end of the tractor being supported by wheel means as will be readily understood by those in the art. The engine has a crankshaft 6 which is connected to the driving member 25 of a power-take-off clutch generally designated 8 which is housed in the forward compartment 9 of the waist portion 4. The driven or output member 7 of the clutch 8 is fixedly connected to a shaft 10 which is coaxial with the crankshaft 6, the shaft 10 forming the power take-off of the continuous independent running type. The shaft 10 extends through a quill or sleeve shaft 11 and is individually supported intermediate its ends as by bearing 12 in the rear end of a tube 12' carried by an upright forward intermediate bulkhead member 13 and the forward bulkhead 22 of the transmission casing portion 4. The shaft 10 rearwardly of the bulkhead member 13 is provided with or keyed to a bevel gear 14 which meshes with a companion bevel gear 15 which provides a side power take-off through a shaft 16 which may be suitably supported by a side wall 17 of the casing 4.

The sleeve shaft 11 is supported intermediate its ends by a bearing assembly 18 which is housed within the forward end of tube 12'. Oil seals 18' are housed in a hub portion 19 of a sleeve 20 which telescopes over a reduced portion 21 at the forward end of the shaft 11, the hub portion 19 being suitably mounted as by bolts 20' to the front bulkhead member 22 of the gear case 4. The sleeve 20 provides a support for a clutch bearing 23 which cooperates with the levers 24 of the driving clutch member 25 which is splined as at 26 on the reduced forward end portion 21 of the sleeve shaft 11.

The rear end of the sleeve shaft 11 is provided with a spur gear 27 which meshes with an idler gear 28 journalled on a shaft 29 from a support generally indicated 30 which is integrated with a pump housing generally indicated 31.

The pump housing is provided with mounting pedestals 32 by means of which it is removably mounted with bolts 33 against the underside of the lower wall 34 of the gear case 4. The idler gear 28 meshes with an input gear 35 which drives through a shaft 36 the forward pump unit 41 which is adapted to supply hydraulic pressure fluid for the lubrication system as well as actuating certain elements of the power transmission as hereinafter set forth. A gear 35 is also connected to the input member or driving member 38 of an electric clutch designated 39 which has an output or driven member 40 which is operatively connected in the usual manner to a high pressure pump 37, said pump 37 being adapted for use in conjunction with the hydraulic lift systems and the like and will not be further described inasmuch as it does not strictly form part of the invention. The only purpose of mentioning the structure is to indicate that the electric clutch 39 is operated to disconnect the high pressure pump when it is not being used in order to conserve power.

The shaft 11 is supported adjacent to the gear 27 on a needle bearing assembly 43 which is housed within the tubular support 12' which is carried at its front end from the front bulkhead member 22 and intermediate its ends passes through the forward intermediate bulkhead member 45 and at its rear end carries the aforementioned bearing 12 and sockets within a complementary aperture in the rear intermediate bulkhead wall member 13.

The spur gear 27 drives an idler assembly 46' and meshes with a lower idler 46 which is rotatably supported on a shaft 47 between a pair of inwardly extending ears or lugs 48 which project into the gear case 4 through an opening 49 in a side wall 50 of the gear case 4, the opening 49 being covered by a combination cover and mounting plate 51 which is suitably secured to the side wall 50 as by bolts 52. The ears 48 support idler 53 therebetween on a shaft 54, the idler 53 meshing with the idler 46 and meshing with an input gear 55 which is connected to a countershaft or input quill member or sleeve 56 of the normal range power transmission assembly generally designated 57.

The assembly 57 comprises in addition to the quill 56 an inner countershaft 58 which at its forward end is rotatably supported in a bearing 59 from the front bulkhead wall cover 22' bolted to front bulkhead wall 22. The quill shaft 56 is supported on bearings 60 and 61 which are carried by the front and rear intermediate bulkhead members 45 and 13 respectively. The forward end of the quill shaft 56 is connected to a driving member 62 of the first electric clutch 63 and the rear extremity of the quill member 56 is connected to the driving member 64 of the rear electric clutch generally indicated 65.

Referring to the front clutch 63 the driven element 66 is connected to the inner countershaft 58 which extends through the quill 56 and through the clutches 63 and 65 and projects rearwardly of a rear clutch 65 and at its rear end 68 is piloted and rotatably supported in a bearing structure 69 of a carrier generally indicated 70 of a planetary transmission unit 73. The rear extremity 68 of the input shaft 58 comprises a sun gear 72 which meshes with single pinions 73' supported on shafts 74 from the carrier 70. The carrier 70 supports a plurality of double pinions 75 on shafts 76, the double pinions 75 meshing with the single pinions 73' and with a ring gear or orbit gear 78 which has a hub portion 79 splined to an output shaft 80 which leads into the output assembly 82 wherein the drive is continued through an output ring gear and differential and into the drive axles of the rear wheels as well known by those skilled in the art. The double pinions 75 of the planetary gear set also mesh with a front sun gear 83 which is connected to a quill shaft 84 sleeved over the shaft 58 and projecting forwardly of the planetary transmission through a rear bulkhead, which is the rear bulkhead member 85 of the housing 4. The quill shaft 84 is connected to the output or driven elements 86 of the rear clutch 65. It will be readily observed in Figure 1 the rear element in addition to being a driven member also incorporates a brake ring 87 which under certain conditions as hereinafter set forth is adapted to be braked by an associated brake band 88 suitably supported from the waist portion 4 of the tractor.

It will also be seen from Figure 1 that the carrier portion 70 of the planetary gear set is provided with a brake ring structure 89 which is adapted to be braked by a surrounding brake band or hoop 90 also suitably supported from the waist structure 4.

Referring now to Figures 2 through 5 and describing the normal range of operation of the transmission, power is transmitted from the driving member 25 of the clutch 8 continuously through the quill shaft 11 to the spur gear 27 and through the idler gears 46—53 to the input gear 55. As will be seen in Figure 2 the first speed is obtained by energizing the forward clutch 63 whereby power is transmitted from the crankshaft 6 through the clutch 63 into the shaft 58 which drives the gear 72 and thus the pinions 73', 75 and outputs into the ring gear 78 and from there into the shaft 80 and out through the output assembly 82. In the first speed the brake band 90 is applied whereby the carrier 70 is held stationary and the brake band 88 is off and the clutch 65 is off so that the front sun gear 83 revolves freely.

In the second speed, power is similarly transmitted into the the quill shaft 56 and through the front clutch 63 and into the shaft 58 and from the rear sun gear 72 into the pinions 73', 75 which orbit about the front sun gear 83 which is held stationary pursuant to application of the brake band 88 through the brake ring 87. The brake band 90 and the rear clutch are disengaged. The power output is through the ring gear 78 into the shaft 80 and into the assembly 82.

In the third gear the power is transmitted into the quill shaft 56 and is divided between the front and rear clutch members 63 and 65 whereby part of the power is transmitted into the center shaft 58 and part through the quill 84 so that the entire planetary system is locked and provides a direct drive from the sun gear 83 through the pinions 75 to the ring 78 and simultaneously from the sun gear 72 through the planets 73', 75 into ring gear 78 and the entire power is transmitted into the tail shaft 80 into the assembly 82. In the third speed both of the brake bands 90 and 88 are off.

In order to provide a reverse drive the power is transmitted into the shaft 56 as best shown in Figure 5 and through the rear clutch which is energized and from the rear clutch into the quill shaft 84 and to the front sun gear 83 and into the double pinion 75 and from there into the ring gear and out to the tail shaft 80. The brake band 90 is applied and the band 88 is off. The front clutch is also disengaged so that the shaft 58 is free rotating.

Referring now to Figures 6 and 7 there is shown a transmission system providing for an under drive or low creeper and creeper drive which entails an idler gear 100 mounted on a stub shaft 101 carried in a casting or bearing means 102 which is secured as by bolts 103 to the underside of a mounting plate 105 which is seated on the top wall 106 of the gear case 4 and covers an access opening 107 provided therein intermediate the ends thereof. Gear 100 meshes with the gear 55 and extends upwardly out of the gear case 4 through the opening 107 and through an opening 108 in the cover or adapter plate 105 and meshes with an input gear 109 which is supported within a gear housing 110 which projects upwardly above the top wall 106 of the gear case 4. The gear 109 is carried on a shaft 111 and is provided with a sun gear 112 which meshes with a speed reduction planetary gear set including pinions 113 which mesh with the sun gear 112 and with a stationary ring gear 114 which is connected to a stationary mounting wall 115 integral with a top wall 116 and side walls 116' and adapter plate or bottom wall 105 of the gear housing 110. The pinions 113 are rotatably supported from a carrier 116a which is connected to a driving element 117 of an electric clutch 118 and on energizing of the clutch 118 the element 117 drives a driven element 119 which is connected to a hub shaft 120 supported in bearings or bearing means 121 in a suitable holder 122 provided on the front side wall 123 of the gear case 110. The shaft 120 is connected or integral with a gear 124 which meshes with an idler gear 125 which projects upwardly of the bottom plate 105 of the creeper speed gear housing 110 through an opening 126 in the plate 105, the gear 125 being mounted on a stub shaft 127 which is carried from the beforementioned casting. The gear 125 extends downwardly into the casing 4 through the opening 107 and meshes with a gear 130 which is connected to the forward end of shaft 58.

Referring now specifically to Figures 6 and 7, in order to drive the tractor at low creeper speed, power is transmitted from the driving element 25 of the clutch through the quill shaft 11, the gear 27, and through the idler gears 46 and 53 into the gear 55. From the gear 55 the power continues through the idler 100 and upwardly therefrom into the input gear 109 and from there into the sun gear 112, the pinions 113 and the carrier 116a. The clutch 118 is energized and therefore the power continues forwardly from the driving element 117 to the driven element 119 and out the output gear 124 and from there downwardly into the idler 125 and from there into the gear 130 which drives the shaft 58. Both front and rear clutches 63 and 65 and brake band 88 of the main transmission are off while the brake band 90 is applied so that the carrier 70 of the main planetary transmission 51 is held stationary. The power continues through the shaft 58 into the sun gear 72 and from there into the single pinions 73' and into the double pinions 75 which revolve about the axes of their respective shafts 76 and deliver the power into the ring gear 78 which in turn delivers the power into the output or tail shaft 80 which is transmitted into the assembly 82.

Referring now to Figure 7, the power is transmitted similarly as described in connection with the transmission of power in Figure 6 with the exception that the brake band 90 is off and the band 88 is on. Under these circumstances the power which is being delivered from the sun gear 72, as seen in Figure 7, continues into the single pinions 73' and into double pinions 75 which then orbits about the stationary front sun gear 83 and deliver the power at a higher speed than that obtained in the arrangement shown in Figure 6 to the ring gear 78 and into the tail shaft 80 of the unit 82.

Figure 8:
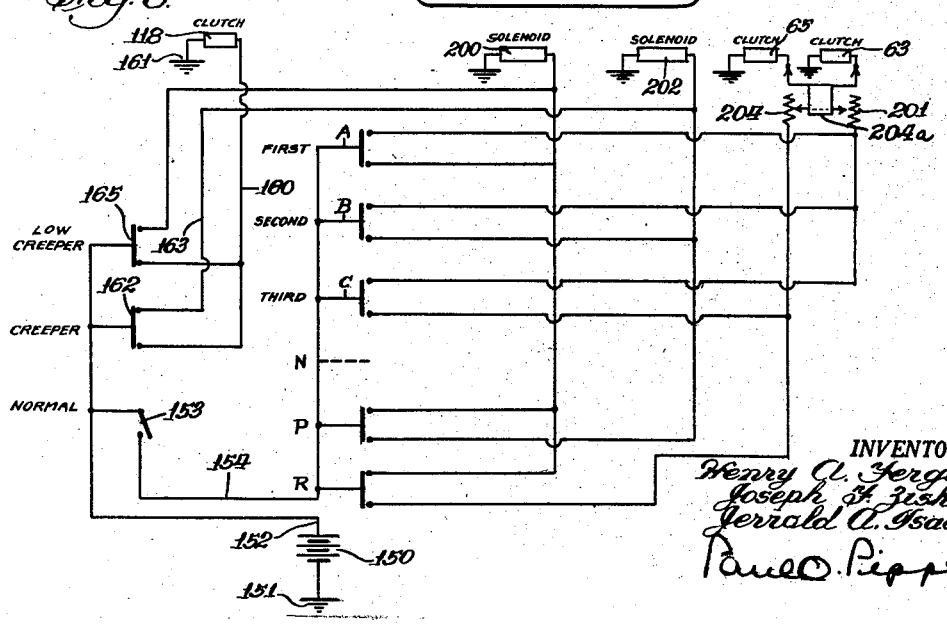
Figure 8 is a schematic electrical system for operating various elements of the transmission.

Figure 8 illustrates a schematic electrical system for operating various elements of the transmission system in order to obtain application of the various clutch elements and brake bands. It will be seen that there is shown a battery 150 which is grounded at 151 in the usual manner to the tractor body and which has a battery lead 152 which connects to a first contact switch 153 which when closed energizes the common line 154 which is connected to switches A, B and C which represent first, second and third speeds and P and R which represent parking and reverse switches. Upon closing of the normal operating range switch 153 and the switch A it will be seen that solenoid 200 and clutch 63 are energized and as explained in the legend this energizes clutch 63 and engages the band 90 through a solenoid 200. The clutch 63 is delivered electrical energy through a rheostat 201 which is suitably connected to a foot operated treadle 204a. In order to obtain second speed, the switch A would be turned off and the switch B would be turned on which would actuate the clutch 63 and solenoid 202 as shown in the legend of Figure 8 for engaging the band 88. In the third speed switch C would be closed, A and B open whereby both clutches 65 and 63 would be energized and it will be seen that clutch 65 is energized through a rheostat 204 and that these rheostats are preferably ganged and interconnected to a common foot treadle 204a. The provision of the rheostats is to govern the application of the clutches in order to ease the power therethrough. In the parking position the switch P is closed and thus both solenoids 200 and 202 apply the bands 90 and 88 so that the planetary gear system 73 is locked. For the reverse position the switch R is closed which applies solenoid 200 and engages brake band 90 and also energizes the rear clutch 65.

For the regular creeper speed, the normal operating range switch 153 is opened and the creeper switch 162 which is connected to the line 152 is closed which energizes through the line 160 the creeper clutch 118 which is grounded to the body on one side as at 161, as is conventional. At the same time the solenoid 202 is energized by connection through the line 163 to actuate band 88.

For the low creeper, switch 165 is closed and the normal operating range switch 153 and switch 162 are opened and thus the solenoid 200 for the brake band 90 and the creeper clutch 118 are actuated.

Figure 9:
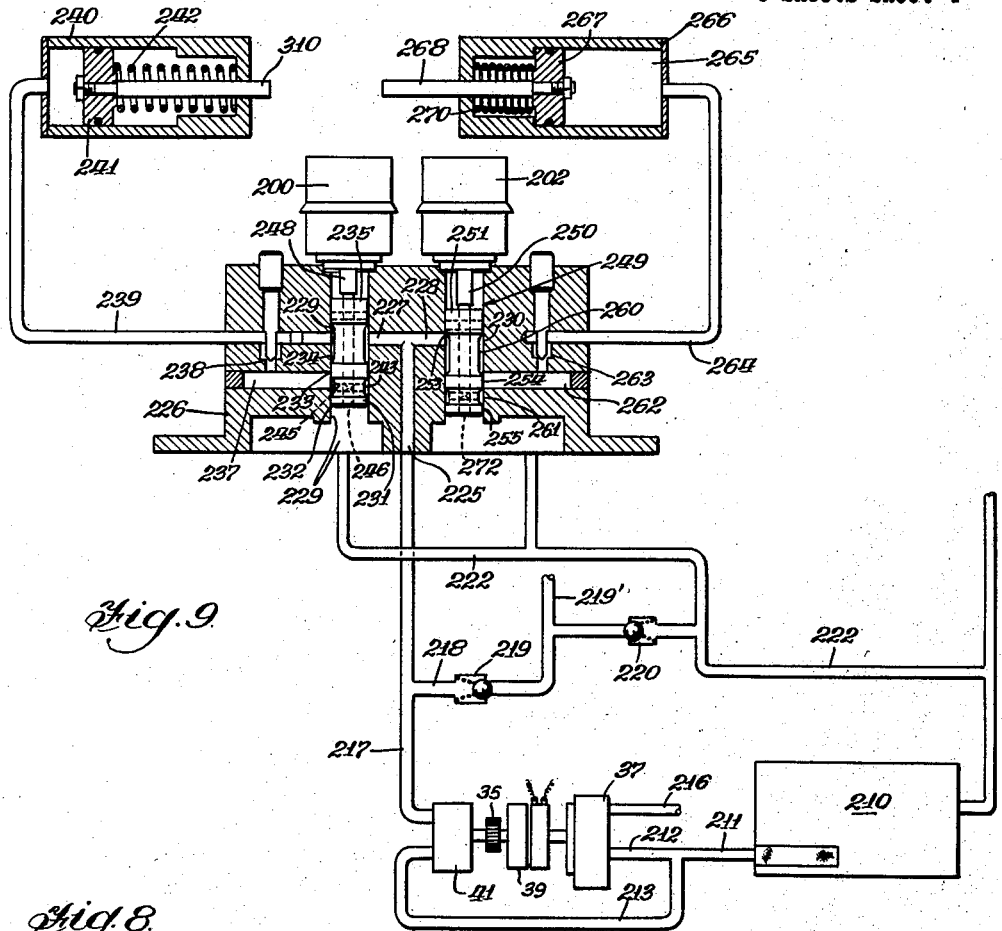
Figure 9 is a partially diagrammatic hydraulic system for operating the brake bands.

Referring now to Figure 9, there is shown a schematic hydraulic system for operating the brake bands and as therein shown the system comprises a reservoir 210 with a discharge conduit or line 211 connected thereto, the line 211 having branches 212, 213 which are connected respectively to the suction sides of the hydraulic lift pump 37 and to the low pressure pump 41 respectively. The hydraulic lift pump has its high pressure or discharge side connected to a discharge or high pressure line 216 which connects with associated hydraulic control and operating mechanism which will not be shown and described inasmuch as it, per se, forms no part of the invention except as it enters into the construction of the pump system and its relationship to the gearing and drive. The low pressure pump 41 has a discharge side connected to the high pressure line or delivery line 217 which is connected through a branch line 218 to a check valve 219 which leads into a lubrication conduit 219', the conduit being connected through a relief one-way valve 220 to a return line 222 which leads back into the sump or reservoir 210. This lubrication line and its connections will not be further described inasmuch as they, per se, do not form part of the invention. The delivery or high pressure line 217 is connected to an inlet port 225 of a valve body 226 and the port communicates through two branches 227, 228 to valve chambers 229 and 230. The inlet port branch 227 communicates with the bore 229 and in the position of the stem 232 which is slidably fitted within the bore or valve chamber 229 communicates with the chamber 234 which is defined between the lands 233 and 235. The spool or stem 232 is shown in its closed position and therefore the high pressure fluid will be contained in the chamber 234. The bore 229 communicates with a combination return and distribution port 237 which leads through a throttle valve 238 into the combination inlet and return conduit 239 which communicates with one end of a cylinder 240 for actuation of a piston 241 which is continuously being urged to its released position with respect to the associated brake band by means of a compression spring 242 which is housed within the cylinder and stressed between the back side of the piston and the opposing wall of the cylinder. It will be noted that the spring exhausts the cylinder 240 through the line 239 and the port 237 and into a chamber 243 which is defined between the land 233 and the land 231 on the spool or stem 232. The fluid is ported through a port 245 in the stem between the lands 233 and 231 and the port 245 communicates with a port 246 which extends axially of the stem and the lower end of the port discharge into the bore 229 there below which communicates with the return line 222 which leads into the reservoir 210.

The upper end of the spool 232 is connected to a rod 248 which is controlled by the solenoid 200.

The construction and functioning of the valve assembly 249 is identical with that indicated at 232 and comprises the solenoid 202 with a stem 250 which operates a spool 251 which includes a plurality of lands 253, 254 and 255 which define chambers 260, 261. In the illustrated position of solenoid 202 the stem is moved to dispose the chamber 260 so that it communicates with the high pressure line branch 228 and the combination return and distribution line 262 which leads through a throttle valve 263 into the return and pressure line 264 which communicates with the chamber 265 of the cylinder 266 with the fluid acting against the piston 267 which has a stem 268 conventionally connected to the associated brake band 88. The spring 270 acts to exhaust the chamber 265 on the stem 251 being positioned to port the fluid from the line 262 through the chamber 261 and the port 272 which communicates with the bore 230 and into the return line 222.

Referring now to Figure 12 there is shown the rear brake band 90 and its actuating means which includes an adjusting and positioning screw 300 suitably supported from the side wall 50 of the housing 4 and abutting one end 301 of the band 90, the other end being operatively pivotally linked by the push rod 302 to the lower output end 303 of upright lever 304 which is pivoted intermediate its ends on a pin 305 carried from lugs 306 depending from the top wall 106 of the housing, the lever having its upper portion 307 projecting through an opening 308 in the wall 106 and having he upper end abutted at 309 against the outer end of the piston rod 310 which is connected to the piston 241 (see Figure 9). The piston rod 268 is connected through an identical system to the brake band 88.

Figure 10:
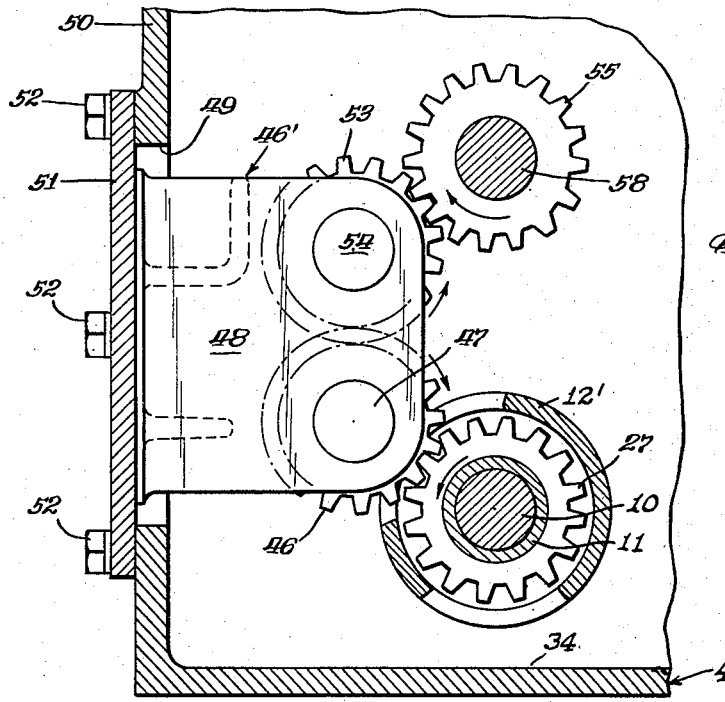
Figure 10 is a fragmentary transverse vertical sectional view on line A—A of Figure 1 showing a forward drive idler gear connection.
Figure 11:
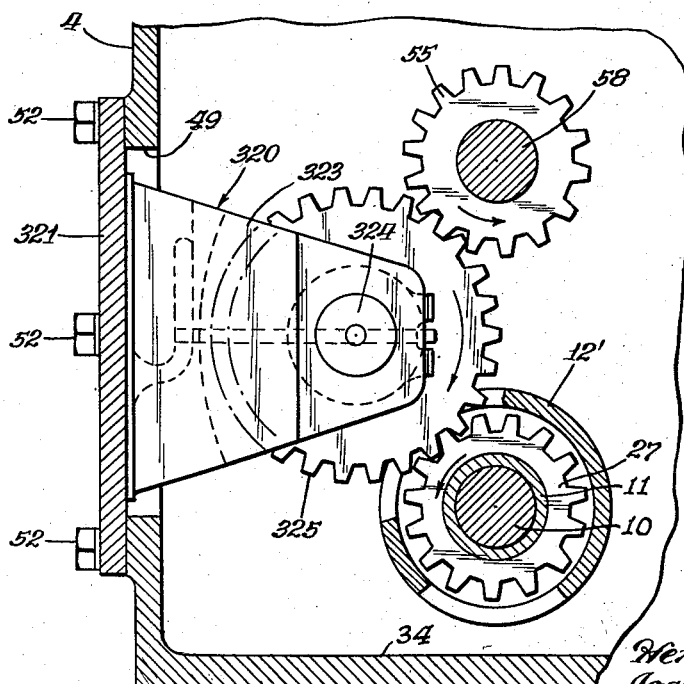
Figure 11 is a fragmentary vertical sectional view on line A—A of Figure 1 showing a reverse drive idler gear connection.

Referring now to Figure 11 there is shown a drive reversing idler gear assembly 320 which is adapted to be substituted for the double idler gear assembly 46' shown in Figure 10. The assembly 320 has a base mounting flange or wall 321 which fits over the wall 50 of housing 4 and bolts thereto by the bolts 52. The base is integrated with a pair of inwardly extending ears or lugs 323 which carry a horizontal shaft 324 journalling a single idler gear 325 which meshes with gears 27 and 55 and thus reverses the rotation of gear 55 as respects to its normal rotation when coupled with the idler assembly 46'. Thus the tractor has a complete range of operating speeds rearwardly including the creeper speeds.

It will be readily appreciated from the foregoing description that a novel compact and versatile transmission has been provided which incorporates an extensive range of speeds and wherein the arrangement of the parts is designed to permit easy substitution of reversing gearing which is in direct power transmission and utilize the full complement of speeds in reverse as are available forwardly for operating harvester-threshers, cotton pickers and other machines which are conventionally operated upon a rearwardly going tractor. It will be understood that the engine is preferably of the non-constant speed type and that the transmission permits changing the ground traversing speeds and torque transfer to the ground wheels 82' while the tractor is in motion.

What is claimed is:

1. In a tractor of the type having a forward engine portion, a rear axle portion with ground-engaging traction means, and an interconnecting medial portion comprising a housing, a drive shaft connected to the engine and rotatably supported in the housing adjacent to the bottom thereof, a driven countershaft supported within said housing above said drive shaft, transmission means operatively interconnecting said driven shaft with said traction means, a drive gear connected to the drive shaft, a driven gear connected to the driven shaft, and first and second idler assemblies alternatively positionable in the same space in mesh with said driving and driven gears and each comprising a base member and support structure thereon and projecting into said housing through an opening in a side thereof, means for removably fastening said base member to said side of the housing in closing relationship to said opening, said first idler assembly comprising a pair of meshing gears mounted on the support structure and one of which meshes with said driven gear and the other with the driving gear, and said second idler assembly having a single gear mounted on the support structure and meshing with said driving and driven gears, said first and second idler assemblies respectively transmitting rotational power in different directions from the driving shaft to the driven shaft.

2. In a transmission for a tractor of the type having an engine at one end, ground traversing tractor propelling means at the other end, an intervening housing with a transmission therein; said transmission including a fore and aft drive shaft adjacent to the bottom of the housing, a first intermediate shaft spaced above the drive shaft and extending generally parallel thereto, a second intermediate shaft coaxial with and extending through said first shaft, a driven shaft operatively connected to said ground traversing means, a transmission means for providing low and intermediate forward drives between said second shaft and said driven shaft and direct drive from said first and second shafts to said driven shaft and reverse drive between said first shaft and said driven shaft, said transmission means including a planetary gear set, and a friction brake for an element of said gear set for providing a reaction for the gear set and completing both the low forward power train and the reverse power train, a pair of first and second clutches, said first clutches completing the low and intermediate power train from said first to said second shaft and the second clutch completing the reverse power train through a second element of said gear set, a friction brake for said second element of the gear set providing a reaction for completing the intermediate power train, a driving and driven gear connected respectively to the driving shaft and to said first shaft, and selectively positionable first and second idler gear assemblies for selectively completing the power train between said driving and driven gears and each comprising an adapter plate portion and a mounting portion extending in the housing through an opening in a side thereof, and said first assembly comprising a pair of meshing gears journalled on the mounting portion and one of which meshes with said driving gear and the other with the driven gear and said second assembly comprising a single gear mounted on said mounting portion and meshing with both said driving and driven gears.

3. In a transmission mechanism, the combination of a drive shaft, an output shaft, first and second intermediate countershafts, means for providing a power train from said drive shaft to said first countershaft, means for providing normal range speed power trains between said second countershaft and said output shaft, a first clutch operative between said first and second countershafts, an auxiliary low speed range transmission disposed in parallel with said first clutch to provide a power path between said first and second countershafts when said first clutch is disconnected and including a planetary transmission having input and driven shafts, means drivingly connecting said input shaft with said first countershaft, and means including a second clutch drivingly interconnecting said driven shaft with said second countershaft.

4. A creeper speed attachment for a power transmission system of the type having a pair of aligned casings detachably interconnected, one of said casings having first and second torque transmitting elements therein and including selectively operable means for drivingly connecting said elements, and the other casing having a rotatable member therein driven by said first torque transmitting elements comprising, an adapter plate interposed between said casings for joining them together, bearing means supported on opposite sides of said adapter plate within respective casings, a first idler gear rotatably carried by said bearing means within said one casing and extending into the other through an opening in said adapter plate, means on the first element and said member in meshing engagement with the idler gear for completing the power train therebetween, transmission means in said other casing comprising a planetary gear set rotatably supported by said bearing means in said other casing and said gear set including an output member and an input member connected to said rotatable member and means for completing the power train between the output member and said second torque transmitting element and including a second idler rotatably supported from said bearing means in said one casing and axially spaced from the first idler and projecting between and drivingly engaging said second element and said output member through an opening in said adapter plate.

5. The invention according to claim 4 and a driven shaft, and means providing several forward power trains between said second torque transmitting element and said driven shaft and including a planetary gear set and a plurality of friction brakes for elements of the gear set and completing said forward power trains.

6. In a tractor of the type having an engine at one end, a wheel-supported axle structure at the other end, and an intervening fore and aft housing interconnecting the engine with said axle structure, said engine having a crankshaft, the combination of a fore and aft drive shaft disposed in the lower portion of the housing and having a driving gear disposed intermediate the ends of the housing, means for drivingly connecting said drive shaft to the crankshaft, first and second coaxial intermediate shafts extending fore and aft and disposed in generally the medial portion of the housing above said drive shaft and said first shaft having a driven gear disposed in alignment with said drive gear, means including said gears for completing the power train therebetween, first and second clutches disposed at opposite sides of the drive gear and having driving elements connected to said first shaft, said first clutch having a driven element connected to said second shaft, a tail shaft, and means for providing low, intermediate and direct forward drives from said intermediate shafts to said tail shaft and a reverse drive power train from the first shaft to the tail shaft and comprising a planetary gear set coaxially arranged with said first and second shafts at the rear of said housing, and a friction brake for an element of the gear set providing a reaction for said gear set and completing both the reverse drive power train and the low forward power train, and a second friction brake for another element of the gear set for providing a reaction for the gear set and completing the intermediate power train, said other element of said gear set connected to the driven member of said second clutch for completing the direct power train.

7. The invention according to claim 6 and said means including said gears for completing the power train therebetween comprising first and second idler assemblies and each comprising an adapter plate selectively positionable for closing an opening in a side of the housing and having bearing means projecting into the housing, said first assembly comprising a single gear extending between and meshing with said driving and driven gears, and said second assembly comprising a pair of meshing idler gears one of which meshes with the driving gear and the other with the driven gear.

8. In a tractor of the type having a wheel-supported rear axle structure, a front engine and an intermediate waist interconnecting said structure and engine and comprising a casing, said engine having a crankshaft, a hollow drive shaft in the lower portion of the casing in axial alignment with said crankshaft and connected thereto, an independent power-take-off shaft extending through said hollow drive shaft and connected to said crankshaft, coaxial first and second intermediate shafts in the casing above said drive shaft, said intermediate shafts having forward and rearward ends disposed respectively adjacent to the forward and rearward extremities of the waist and said second shaft extending rearwardly of the first, and a tail shaft coaxial with said intermediate shafts and disposed rearwardly thereof, transmission means for completing a power train between said drive shaft and said first shaft at a point intermediate the ends of the latter, power train means for establishing a plurality of different drive power trains between said second shaft and said tail shaft through the rear end of the former and between said first shaft and said tail shaft through the rear end of the former, and clutch means between said first and second intermediate shafts for transmitting drive from the forward end of the first to the forward end of the second shaft.

9. In a tractor, a forward engine; a rear traction-wheel mounted casing; a tubular body extending lengthwise of the tractor in interconnecting relation with the engine and the casing; a transmission in said body comprising a drive shaft extending lengthwise of the tractor in the lower portion of the body and driven from the engine, first and second countershafts in said body above said driving shaft, clutch means between said countershafts, a tail shaft operatively connected to the traction wheels and disposed in said casing rearwardly of said countershafts, means for providing a plurality of forward drive power trains from said second countershaft to said tail shaft and a direct drive from said first and second countershafts to said tail shaft, means for completing the power train between said drive shaft and said first countershaft at a point intermediate the ends of the body, a creeper speed transmission comprising a housing detachably mounted to a side of said body and means for completing a power train to said creeper speed transmission from said first countershaft and other means for completing a power train from said creeper speed transmission to said second countershaft at a point forwardly of said last-mentioned means.

10. The invention according to claim 9 and said means for completing the drive from the drive shaft to the first countershaft comprising selective first and second idler gear assemblies alternatively mountable on the body and each including support structure projecting into the body through an opening in a side thereof, and an adapter plate connected to said structure and removably connected to said body in closing relation to said opening therein, and said first assembly comprising a pair of meshing idler gears rotatably supported on the structure and one of the idler gears disposed in driven relation to said driving shaft and the other idler gear disposed in driving relation to said first countershaft, and said second assembly comprising a single idler gear disposed in driven relation by the driving shaft and in driving relation to the first countershaft.

11. In a tractor, an engine; a traction-wheel mounted casing; a tubular body extending lengthwise of the tractor in interconnecting relation with the engine and the casing; a transmission in said body including driving and several driven shaft elements, means selectively interposable between said driving shaft and one of said driven shafts for completing the drive between said shafts whereby said shafts rotate in the same direction or in a reverse direction and transmission means between said driven shaft elements and the tractor wheels of the tractor and including selective change speed elements for completing a plurality of different speed power trains, and comprising an auxiliary transmission attachment including a support, torque transfer means carried on the support for transferring torque from one of said driven shaft elements to said auxiliary transmission and for transmitting torque from said auxiliary transmission to another of said driven shaft elements and including a housing removably secured to said body in closing relation to an opening in the top side thereof and through which said torque transfer means operate.

12. In a tractor of the type having an engine, a traction-wheel mounted casing, and an intervening tubular body extending longitudinally of the tractor in interconnecting relation to the engine and casing, a drive shaft in the lower portion of the body extending lengthwise of the tractor, first and second countershafts in the body in the upper portion thereof, means for completing a power train from the drive shaft to the first countershaft and including a driving gear on the drive shaft and a driven gear on the first countershaft, pump means underposed with respect to said body and including means for completing a power train from said drive gear and operative through a bottom opening in said body, a housing for said pump means and said last-mentioned means removably secured to said body in closing relation to said bottom opening, a creeper speed auxiliary transmission including a casing mounted on top of the body and having means for completing a power train therethrough operative through a top opening in the body from said driven gear to said second countershaft, means including a planetary gear set between said first and second countershafts for transmitting power to said traction wheels, said gear set including at least one element and a friction brake operative therewith to provide a reaction for the gear set to complete a power train, and a pump means actuated system selectively operative of the friction brake.

References Cited in the file of this patent

UNITED STATES PATENTS

| | | |
|---|---|---|
| 2,477,252 | Hutchings | July 26, 1949 |
| 2,580,480 | Strehlow et al. | Jan. 1, 1952 |
| 2,654,255 | Ferguson et al. | Oct. 6, 1953 |
| 2,718,271 | Jedrzykowski | Sept. 20, 1955 |
| 2,719,442 | O'Leary | Oct. 4, 1955 |
| 2,743,789 | Ferguson et al. | May 1, 1956 |
| 2,805,743 | Keese | Sept. 10, 1957 |